No. 795,965. PATENTED AUG. 1, 1905.
McCLELLAN FULLENLOVE.
ELEVATOR BRAKE.
APPLICATION FILED JAN. 13, 1905.

Witnesses:

Inventor
McClellan Fullenlove

UNITED STATES PATENT OFFICE.

McCLELLAN FULLENLOVE, OF LOUISVILLE, KENTUCKY, ASSIGNOR TO FULLENLOVE ELEVATOR COMPANY, OF LOUISVILLE, KENTUCKY, A CORPORATION OF KENTUCKY.

ELEVATOR-BRAKE.

No. 795,965.    Specification of Letters Patent.    Patented Aug. 1, 1905.

Application filed January 13, 1905. Serial No. 240,944.

*To all whom it may concern:*

Be it known that I, McCLELLAN FULLENLOVE, a citizen of the United States, and a resident of 2904 West Kentucky street, in the city of Louisville, in the county of Jefferson and State of Kentucky, have invented certain new and useful Improvements in Elevator-Brakes, of which the following is a specification.

This invention relates to elevator-brakes, and particularly to that type in which a spiral carried by the cage travels on a fixed rack and the cage is stopped when the traveling spiral is braked by causing the latter to move axially against a braking-surface of conical shape. This form of brake is shown in an application filed by me on August 4, 1904, Serial No. 219,507. In brakes of this character when the traveling spiral moves axially relatively to the cage, due to the fall of the cage or otherwise, the spiral becomes wedged between the braking-surface and it is a very hard task to separate them when the cage is again to be started. It is therefore the object of my invention to provide means for overcoming this objection.

Figure 1:
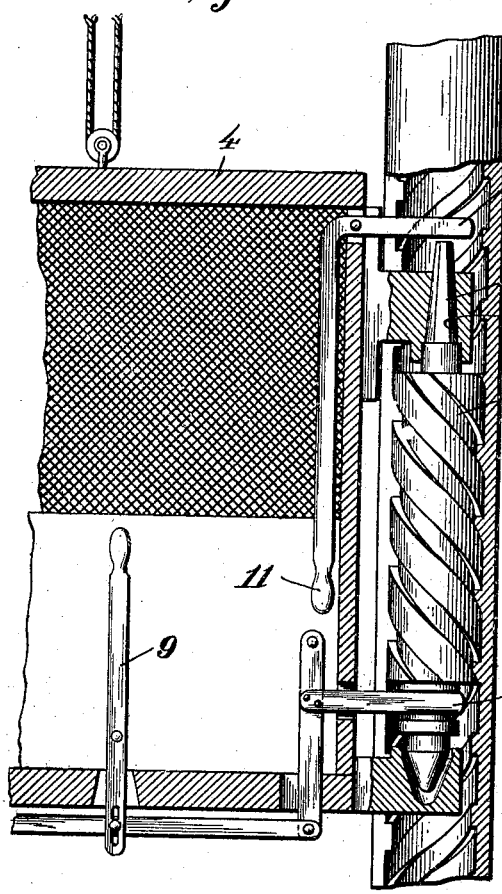
Figure 2:
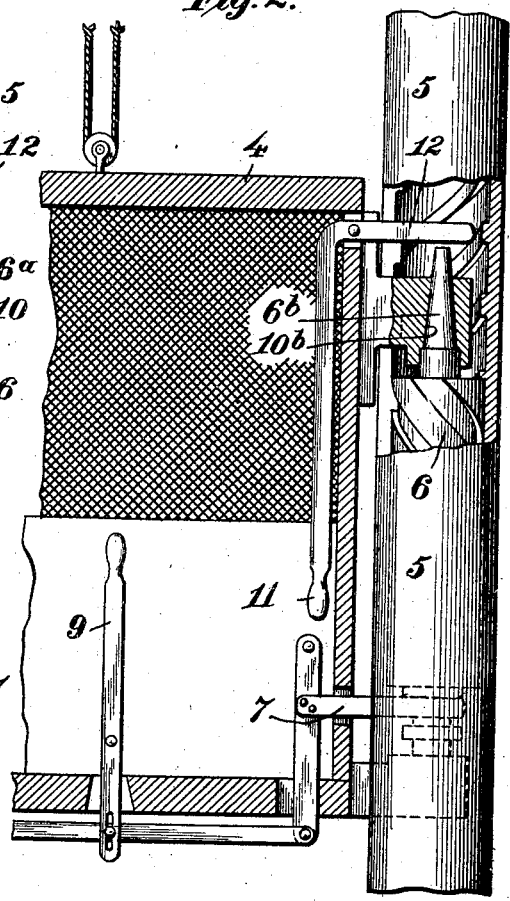
Figure 4:
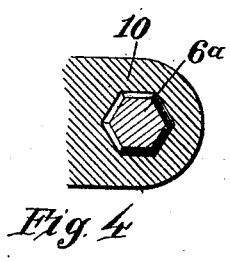
Figure 3:
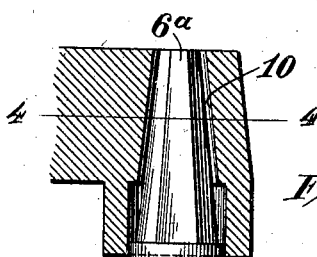

In the drawings, Figure 1 is a vertical section of the form of brake shown in my application aforesaid with one embodiment of my improvement attached thereto. Fig. 2 is another embodiment of my improvement. Fig. 3 is an enlarged detail view of the embodiment shown in Fig. 1; and Fig. 4 is a section on the line 4 4, Fig. 3.

Referring more particularly to the drawings, 4 indicates the elevator-cage; 5, the fixed rack or spiral; 6, the traveling spiral, and 7 a band-brake controlled by a lever mechanism 9, as described in my application aforesaid, to cause the traveling spiral 6 to move axially relatively to the cage and the upper tapering end of the spiral 6 to move against a tapering braking-surface on the cage, and thereby prevent the rotation of the traveling spiral. This same result, however, may be accomplished by the breaking of the hoisting-rope, in which instance the cage drops faster than the spiral, causing the axial movement.

Carried by the cage is an inverted-L-shaped pivoted lever, the lower end of which is provided with a hand-grip 11, while the upper end 12 extends over the upper tapering end of the spiral 6 and is adapted when the hand-grip 11 is pulled away from the wall of the cage to cause the spiral 6 to move axially and out of engagement with the tapering braking-surface.

In Figs. 1 and 3 the tapering end $6^a$ of the spiral 6 and the tapering braking-surface 10 on the cage are of pyramidal shape, while in Fig. 2 these parts ($6^b$ and $10^b$, respectively) are of the shape of a cone of revolution. The former shape is preferred, as a braking action takes place much quicker and the binding between the parts is not so great—in fact, in some instances it is not necessary to employ the manually-operated lever to separate the parts.

Having thus described my invention, what I claim is—

1. In an elevator-brake, the combination of the cage, having a braking-surface, the fixed rack, a spiral for travel with the cage movable axially relatively thereto, and having a braking-surface movable into engagement with the surface on the cage, and means carried by the cage for separating the two braking-surfaces.

2. In an elevator-brake, the combination of the cage having a tapering braking-surface, the fixed spiral, a spiral for travel with the cage movable axially relatively thereto, and having a tapering braking-surface, movable into engagement with the braking-surface on the cage, and means carried by the cage for separating the two braking-surfaces.

3. In an elevator-brake, the combination of the cage having a tapering braking-surface, the fixed spiral, a spiral for travel with the cage movable axially relatively thereto, and having a tapering braking-surface movable into engagement with the braking-surface on the cage, and manually-operated means carried by the cage for separating the two braking-surfaces.

4. In an elevator-brake, the combination of the cage having a tapering braking-surface, the fixed spiral, a spiral for travel with the cage movable axially relatively thereto, and having a tapering braking-surface movable into engagement with the braking-surface on the cage, and manually-operated means carried by the cage and engaging the traveling spiral to separate the braking-surfaces.

5. In an elevator-brake, the combination of the cage having a pyramidal braking-surface, the fixed spiral, a spiral for travel with the cage movable axially relatively thereto, having a pyramidal braking-surface movable into engagement with the braking-surface on the cage, and means carried by the cage for separating the two braking-surfaces.

6. In an elevator-brake, the combination of the cage having a pyramidal braking-surface traveling therewith, a fixed rack, a spiral traveling with the cage movable axially relatively thereto and having a pyramidal braking-surface movable into engagement with the braking-surface traveling with the cage.

The foregoing specification signed at Louisville, Kentucky, this 28th day of November, 1904.

McCLELLAN FULLENLOVE.

In presence of—
F. H. KAPPA,
STELLA C. NORRIS.